Nov. 29, 1960 J. GROSVALET 2,962,605

JUNCTION TRANSISTOR DEVICES HAVING ZONES OF DIFFERENT RESISTIVITIES

Filed Jan. 13, 1958 2 Sheets-Sheet 1

JEAN GROSVALET

BY: Cushman, Darby & Cushman

ATTORNEYS

JEAN GROSVALET

BY: Cushman, Darby & Cushman
ATTORNEYS

United States Patent Office 2,962,605

Patented Nov. 29, 1960

2,962,605

JUNCTION TRANSISTOR DEVICES HAVING ZONES OF DIFFERENT RESISTIVITIES

Jean Grosvalet, Paris, France, assignor to Compagnie Generale de Telegraphie Sans Fil, a corporation of France Filed Jan. 13, 1958, Ser. No. 708,669

Claims priority, application France Jan. 18, 1957

19 Claims. (Cl. 307—88.5)

The present invention relates to semi-conductive structures of a novel and improved type.

The semi-conductive structure according to the invention comprises at least a first junction defined by two adjacent semi-conductive zones of different conductivities i.e. of different purities, such that there appears across this junction a space-charge barrier or depletion layer extending mainly into the purer of these two zones, a third zone in substantially ohmic contact with the purer zone and forming a second junction with the higher conductivity zone. Of course, the higher conductivity zone must, nevertheless, be sufficiently pure for the second junction to withstand the reverse-bias to which it is subjected in operation.

According to the invention, the width of the depletion zone or barrier is controlled by means of the bias potential applied to the first junction, whereby said barrier may separate said third zone from said purer zone, thus switching on and off the current flowing through the device.

The device of the invention can also operate as a very sensitive photoelectric cell, the action of the light also causing the barrier to be shifted with respect to the third zone.

Figure 4:
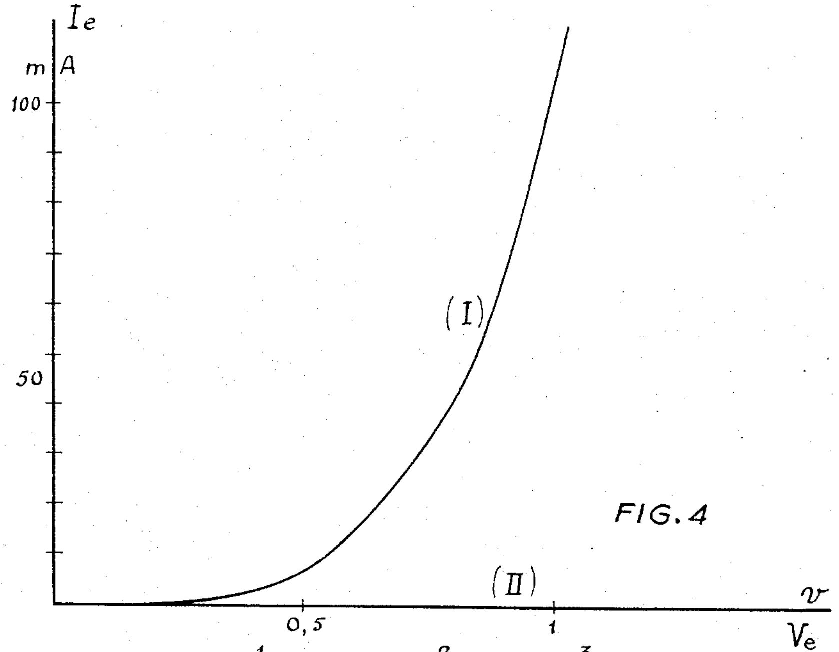
Figure 1:
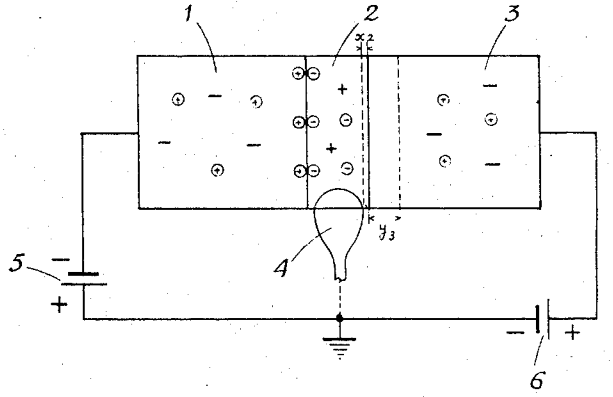
Figure 2:
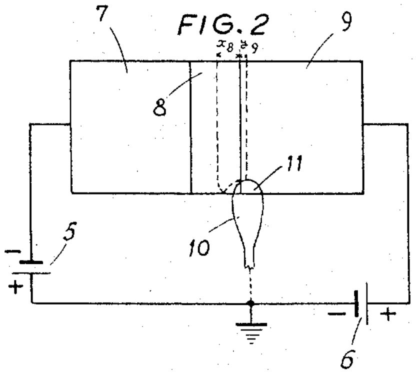
Figure 3:
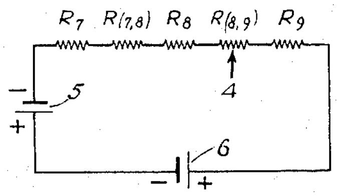
Figure 9:
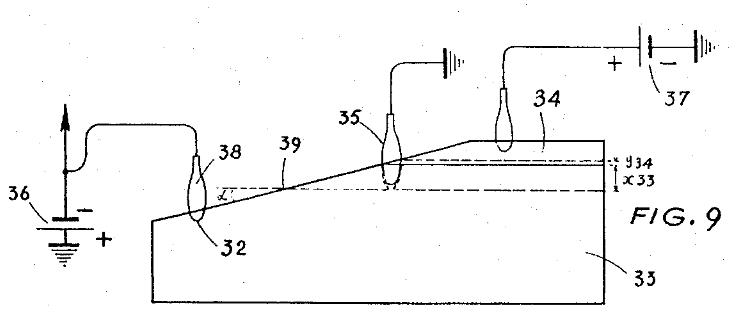
Figures 5, 6:
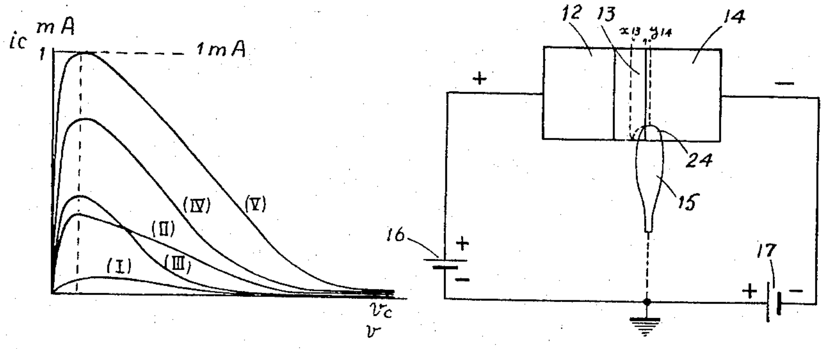
Figure 7:
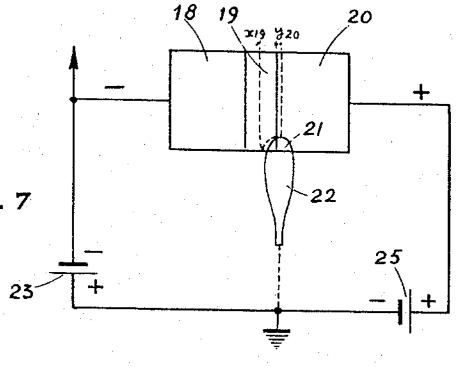
Figure 8:
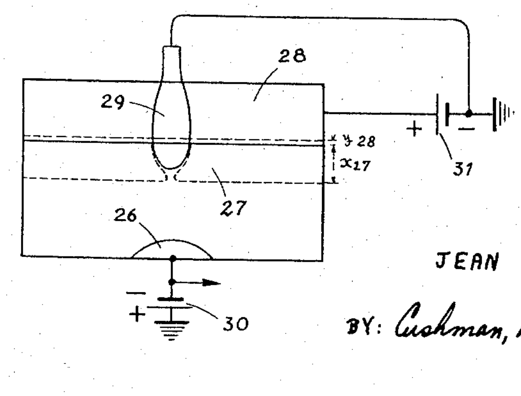

The invention will be best understood from the following description of some embodiments thereof and from the appended drawings, wherein:

Fig. 1 diagrammatically shows a conventional junction transistor;

Fig. 2 diagrammatically shows a semi-conductive device of the n-p-n type according to the invention;

Figs. 3, 4, 5 are graphs and diagrams explaining the operation of the structure illustrated in Fig. 2;

Fig. 6 diagrammatically shows a semi-conductive device of the p-n-p type according to the invention, and Figs. 7, 8, 9 illustrate schematically variations of the semi-conductive structure according to the invention.

The junction transistor shown in Fig. 1 comprises an n-type emitter 1, an n-type collector 3 and a p-type base 2, forming a conventional germanium "grown" junctions transistor. Base 2 is, for instance, 30 to 40 microns thick, and a suitable conductor 4, is shaped in such a manner as to cross the whole of the breadth of zone 2, without penetrating into zones 1 and 3. By way of example, the respective resistivities of zones 1, 2 and 3, may be of the 0.2 ohms-cm./cm.$^2$, 1 ohm-cm./cm.$^2$, and 3.5 ohms-cm./cm.$^2$ It will be appreciated from this numerical example, that in accordance with the conventional practice, base 2 is much less pure than collector 3. It is also known that in such transistors negative majority carriers and positive impurity ions, shown in the conventional manner in Fig. 1, exist in zones 1 and 3, while negative impurity ions and positive minority carriers exist in region 2. This leads to the occurrence in the two boundary regions between zones n and p of what is known as a depletion layer or barrier zone, wherein there is a dearth of free carriers whose concentration is practically null. The extent of this layer into each of the two contacting zones and its location with respect to the boundary therebetween depend upon the respective impurity concentrations of these zones. As shown in Fig. 1, the depletion layer extends over a distance $x_2$ into base 2 and over a distance $y_3$ into collector 3. It is know that $x_2$ and $y_3$ are in microns equal to $$\sqrt{U.\rho} \qquad (1)$$

where $\rho$ is the resistivity in ohms-cm./cm.$^2$ of the concerned zone and U the potential difference in volts across the junction. In a conventional grown junction transistor, zone 3 is much purer than zone 2, and $x_2$ may be considered negligible as compared to $y_3$. Applying to the transistor of Fig. 1 the conventional bias potentials, provided by batteries 5 and 6, i.e. a forward bias to junction (1, 2), and a reverse bias junction (2, 3), the width of layer ($x_2y_3$) will increase, whereas the width of the corresponding layer across the junction (1, 2) decreases, reaching a substantially zero value. The electrons, which are majority carriers in zone 1, then cross the emitter junction (1, 2), under the action of the electric field provided by source 5, and penetrate into base 2. They are then swept into collector zone 3 under the action of the electric field provided by source 6, thus giving rise to a substantial collector current.

Referring now to Fig. 2, this figure also shows a semi-conductive structure comprising an emitter region 7, a base region 8 and a collector region 9 and which is, for example, of the "grown" type, the respective resistivities of the three above zones being 0.5 ohm-cm./cm.$^2$, 20 ohms-cm./cm.$^2$ and 1 ohm-cm./cm.$^2$ The width of the base region may be of the order of 30 to 40 $\mu$. According to an essential feature of the invention connection 10 is astride the junction 8—9 and is coupled to a p+ conductivity type region 11 which is in substantially ohmic contact with region 8 and forms a junction with region 9. Region 11 may for instance be provided by diffusion, in the semi-conductor of regions 8 and 9, of an activator contained in the material of connection 10, which is for instance a gold-gallium alloy (gallium being a p forming impurity). Furthermore base region 8 is purer than collector region 9. Accordingly width $x_8$ is, even in the absence of any bias, distinctly greater than width $y_9$. If the structure is biased as shown in Fig. 2, width $x_8$ is still increased.

It may be shown that, with a collector voltage of about 12 volts, $x_8$ is equal to 16 $\mu$.

The structure in Fig. 2 is, in terms of ohmic resistance, equivalent to the network shown in Fig. 3. In this figure, $R_7$ designates the resistance of zone 7, $R_{(7,\ 8)}$ that of junction (7, 8), $R_8$ that of zone 8, $R_{(8,\ 9)}$ that of junction (8, 9) and $R_9$ that of zone 9. It should be noted that resistances $R_7$, $R_{(7,\ 8)}$, $R_8$ and $R_9$, are at most of only a few ohms and are practically negligible with respect to resistance $R_{(8,\ 9)}$, of one or several megohms, the junction (8, 9) being biased in the reverse direction. Provided connection 10 is at least in part in the $x_8$ portion of the depletion layer, it behaves like a movable tap on resistance $R_{(2,\ 3)}$, the position of the tap depending upon the bias potential provided by battery 6.

Under these conditions, zone 8 is no more at ground potential as in a conventional transistor, and nearly all of the potential drop between the plus pole of battery 5 and the ground occurs across resistance $R_{(8,\ 9)}$. Thus, zones 7, 8 are practically at the same potential and, consequently, the free electrons of zone 7 are unable to cross the barrier between zones 7 and 8 to penetrate into zone 8. Theory and practice show that under these conditions, only a small current flows between the emitter and the collector.

Of course, if the collector bias is reduced to a sufficiently small value, $x_8$ decreases and it can then occur that zone 11 is no more separated from the base zone 8. The structure of Fig. 2 will then operate as the transistor of Fig. 1.

It will be appreciated that the position of connection 10 with respect to the base-collector barrier or depletion layer is not absolutely critical; as long as the barrier is interposed between the base zone, and the zone 11, the emitter current will be blocked.

Another explanation of the operation of the device shown in Fig. 2 may be given, which differs somewhat from the above explanation corresponding to Fig. 3. It is well known that, in conventional n-p-n type transistors, part of the electrons crossing the emitter junction to penetrate into the base recombine with the free holes they meet in this latter zone and for this electron flow to go on, it is essential that additional holes be generated at the base electrode to replace those which combined with electrons. In the n-p-n structure of Fig. 2, when region 11, and therefore connection 10, are separated from the base region, no such generation of free holes in the base region is possible and the drift of free electrons into the base is stopped.

Experience shows that a relatively low collector voltage suffices to stop the emitter current in the device of Fig. 2, the value of this voltage depending on the relative purity of zones 2 and 3 and the position of connection 4.

In Fig. 4 the emitter current $I_e$ in ma., has been plotted against the emitter voltage $V_E$ in volts, for (I) a collector voltage equal to zero and (II) for a collector voltage equal to a few volts. Curve (II) coincides with the $x$-axis. Thus, even a small collector bias blocks the emitter current: the device according to the invention may therefore be used as a very sensitive relay.

Referring to Fig. 5, the collector current $i_c$ in milliamperes of the structure of Fig. 2 is shown as a function of the collector voltage $v_c$ in volts for a base current $i_b$ respectively equal to 0 (curve I), to 6 $\mu$a. (curve II), to 8 $\mu$a. (curve III), to 14 $\mu$a. (curve IV) and to 20 $\mu$a. (curve V).

It may be seen from these curves that, as soon as the collector voltage exceeds a few volts, the collector current starts decreasing. For substantial portions of these curves, the structure of Fig. 2 thus displays a negative resistance which, in the particular example considered, is of about 10,000 Ω. Conventional transistors do not show this remarkable property: on the contrary, their collector current is substantially independent of the collector bias, once the latter is sufficient for causing the electrons which entered zone 2 from zone 1, to cross the depletion layer ($x_2$, $y_3$).

In the case of the structure of Fig. 2, for small values of collector bias, curves $i_2$—$v_c$ are similar to those of a conventional transistor. However, for greater values of the collector bias, as $x_8$ increases in width, the collector current gradually decreases, due to the fact that the portion of connection 10 lying in the depletion zone is progressively increasing. Due to this remarkable property, the semi-conductor structure according to the invention may be used in an oscillator circuit of conventional type.

The structure of Fig. 2 has also the properties of a highly sensitive photoelectric cell. If, the structure being biassed for blocking emitter current, its base 2 is illuminated, even with a low intensity, particularly in the vicinity of connection 10, a substantial current is instantly observed to flow in the structure. It can reach several amperes and cause the germanium to fuse, if no precautionary measures are taken. This result may be explained as follows: the light incident upon the base region injects therein carriers, i.e. electrons in the considered instance. These carriers diffuse into the collector, which results in an increase of the collector current and, on account of the collector resistance, or a resistance in series therewith, in a decrease of the collector-base potential difference and therefore of the width $x_8$. Thus, connection 10 is again outside the depletion layer and the structure is no more blocked. The cell thus provided is more sensitive than a photo-diode which may be explained by the fact that the current flowing through this structure is a forward current, whereas in a photo-diode it is a reverse current.

It should be particularly noted that the remarkable properties of the semi-conductor structure according to the invention have been experimentally observed. While applicant has attempted to provide a satisfactory physical explanation of the operation of this structure, he is of course not bound by any such explanation, the invention having for its primary object the provision of the above structure and the operation thereof.

Many other structures could be devised in which the depletion layer or barrier, existing across the base collector junction is shifted towards or from connection 10, under the action of a collector bias or of the light.

Other embodiments of the invention will be described hereinafter by way of non limitative examples.

Figure 6 shows a semi-conductor grown germanium structure entirely similar to that of Fig. 2 except that it is of the p-n-p type. In accordance with the invention, zone 14 will be purer than zone 13, so that the barrier or depletion zone extends mainly into base 13. The operation of the device of Fig. 6 is similar to that of Fig. 2, the respective polarities of bias sources 16 and 17 being of course reversed with respect to those of Fig. 2. Further, while in the structure of Fig. 2 zone 11 in the immediate vicinity of connection 15 was of the p+ type, i.e. a type p of higher impurity concentration than that of the remainder of the base region, in structure of Fig. 6 this zone 24 will be of type n+.

Fig. 7 shows a structure comprising three zones: a zone 18, or "output zone," which is, preferably, of the p+ type, or the the p type, a base zone 19 of the p type, and a zone 20 or "grid" zone of the n type, the impurity concentrations in this latter zone being higher than in zone 19. Zone 21 or "source" is of the p+ type and is arranged as in previous examples. Under these conditions, the free holes of zones 18 and 19 are attracted by the negative polarization provided by battery 23, and a current is established between source 21 and output 18. This current may be controlled by the positive bias applied to grid 20 by battery 22, which bias results in the displacement of the space-charge barrier or depletion zone at junction (19, 20) in such a manner that it separates more or less completely zone 19 from connection 22 and thus blocks the current more or less completely.

It is to be noted that in the semi-conductor structure of Fig. 7, the bias source 25, to which a signal to be amplified may be superimposed, controls the current of the device practically without taking any part in the production of the charges which constitute this current. This structure is therefore akin to vacuum tubes and to field effect transistors, rather than to conventional transistors as is the case for the structure illustrated in Fig. 2. The intelligence impressed upon the latter contributes charges to the current flowing therethrough.

It is obvious from the above that the structure of Fig. 7 can be operated at higher frequencies than that of Fig. 2. Figs. 8 and 9 show modifications of the structure illustrated in Fig. 7. This type of structure is the preferred embodiment of the invention.

In Fig. 8, the source 29, which is of the p+ type, extends into base zone 27 which is of the p type, through the grid zone 28 which is of the n type and is biased by the positive source 31.

The output zone 26, of type p+, may for example be obtained by soldering an indium-coated nickel plate to a germanium plate 27, into whose surface zone 28 has been diffused, or by other methods which are well known to those skilled in the art.

The device in Fig. 8 operates exactly in the same way as that of Fig. 7, the variation of the width $x_{27}$ of barrier (27, 28), for a varying voltage supplied by source 31, resulting in the blocking or unblocking of the current flowing between source 29 and output zone 26 according to whether region 29 is more or less separated from region 27 by the barrier.

In the modification shown in Fig. 9, a silicon strip 33 of type p, of a thickness of about 150 to 200$\mu$ is preferably used to serve as the base region; impurities are diffused into the upper surface thus providing a thin region 34, for example of 30 to 50$\mu$, of type n, which is the grid zone to which the positive pole of the polarization source 37 is connected. Thus, a control is effected of the width $x_{33}$ of barrier (33, 34), into which penetrates the grounded source connection 35. The output zone 32, of type p+, is formed by the end of output connection 38, connected to a negative biasing source 36. Surface 39 on which connections 35 and 38 are established is bevelled, with an angle $\alpha$ of about 3 to 6°. For the sake of clarity, this angle is made much greater in the figure, so as to increase the outer surface of barrier (33, 34).

The structure in Fig. 9 operates in quite a similar way as that in Fig. 8. A similar operation may also be obtained by reversing the respective polarities of the various sources and by conferring to the various zones and connections the following conductivity types:

| | |
|---|---|
| Zone **32** | n+ |
| Zone **33** | n |
| Zone **34** | p |
| Connection **35** | n+ |

It is to be understood that the invention is in no way limited to the embodiments described herein and that various modifications and variations may be made therein without departing from the scope of this invention.

What I claim is:

1. A signal translating device comprising: a body of semi-conductive material having a pair of zones of opposite conductivity type meeting at a first junction, a first one of said zones having a resistivity substantially higher than the second one; a third semi-conductor zone, in substantially ohmic contact with said first zone innerly of the structure and forming a second junction with said second zone; and means for reversely biasing said first and said second junctions.

2. A signal translating device comprising: a body of semi-conductive material having a pair of zones of opposite conductivity type meeting at a first junction, said first junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone; and means for reversely biasing said first and said second junctions.

3. A signal translating device according to claim 1, further comprising means for varying the bias potential of said first junction.

4. A signal translating device comprising: a body of grown semi-conductive material having a pair of zones of opposite conductivity type meeting at a first junction, said junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone; means for reversely biasing said first and said second junctions; a fourth zone having the same conductivity type as said second zone and forming with said first zone a third junction; and means for biasing said third junction in the forward direction.

5. A signal translating device comprising: a body of semi-conductive material having a pair of zones of opposite conductivity type meeting at a first junction, a first one of said zones having a resistivity substantially higher than the second one; a third semi-conductor zone in substantially ohmic contact with said first zone innerly of the structure and forming a second junction with said second zone; means for reversely biasing said first and said second junctions; a fourth zone, having a conductivity type opposed to that of said second zone, and said fourth zone being in substantially ohmic contact with said first zone.

6. A signal translating device comprising: a body of semi-conductive material having a pair of zones of opposite conductivity type meeting at a first junction, said junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone; means for reversely biasing said first and said second junctions; a fourth zone having a conductivity type opposed to that of said second zone and being in substantially ohmic contact with said first zone.

7. A signal translating device according to claim 5, in which said substantially ohmic contact between said first and said third zone is entirely embedded within the semi-conductive material.

8. A signal translating device comprising: a silicon body having a bevelled face and a pair of zones of opposite conductivity type meeting at a first junction which extends inwardly from said bevelled face, a first one of said zones having a resistivity substantially higher than the second one; a third zone forming a second junction with said second zone and penetrating into said first zone for forming therein a substantially ohmic contact which is entirely embedded within said body; a fourth zone having a conductivity type opposed to that of said second zone, said fourth zone being in substantially ohmic contact with said first zone at said bevelled face; and means for reversely biasing said first and second junctions.

9. A signal translating device according to claim 8, wherein said second zone has an n type conductivity, said first zone an n type and said third and fourth zone a p+ type conductivity.

10. A signal translating device according to claim 8, wherein said first zone has an n type conductivity, said second zone a p type conductivity, and said third and fourth zone an n+ type conductivity.

11. A semi-conductor structure comprising: a body of semi-conductive material having a pair of zones of opposite conductivity type meeting at a first junction, a first one of said zones having resistivity substantially higher than the second one and a third semi-conductor zone, in substantially ohmic contact with said first zone innerly of the structure and forming a second junction with said second zone.

12. A semi-conductor structure comprising: a body of semi-conductive material having a pair of zones of opposite conductivity type meeting at a first junction, said first junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone.

13. A semi-conductor structure comprising: a body of grown semi-conductive material having a pair of zones of opposite conductivity type meeting at a first junction, said junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone; a fourth zone having the same conductivity type as said second zone and forming with said first zone a third junction.

14. A semi-conductor structure comprising: a body of semi-conductive material having a pair of zones of opposite conductivity type meeting at a first junction, a first one of said zones having a resistivity substantially higher than the second one; a third semi-conductor zone in substantially ohmic contact with said first zone innerly of the structure and forming a second junction with said second zone; a fourth zone, having a conductivity type opposed to that of said second zone, and said fourth zone being in substantially ohmic contact with said first zone.

15. A semi-conductor structure comprising: a body of semi-conductive material having a pair of zones of opposite conductivity type meeting at a first junction, said junction extending inwardly from one face of the body, a first one of said zones having a resistivity substantially higher than the second one; a third semi-conductor zone having a resistivity substantially lower than that of said first and second zones and forming at said face a substantially ohmic surface contact with said first zone and a second junction with said second zone; a fourth zone having a conductivity type opposed to that of said second zone and being in substantially ohmic contact with said first zone.

16. A semi-conductor structure according to claim 14, in which said substantially ohmic contact between said first and said third zones is entirely embedded within the semi-conductive material.

17. A semi-conductor structure comprising: a silicon body having a bevelled face and a pair of zones of opposite conductivity type meeting at a first junction which extends inwardly from said bevelled face, a first one of said zones having a resistivity substantially higher than the second one; a third zone forming a second junction with said second zone and penetrating into said first zone for forming therein a substantially ohmic contact which is entirely embedded within said body; a fourth zone having a conductivity type opposed to that of said second zone, said fourth zone being in substantially ohmic contact with said first zone at said bevelled face.

18. A semi-conductor structure according to claim 17, wherein said second zone has an n type conductivity, said first zone an n type and said third and fourth zones a p+ type conductivity.

19. A semi-conductor structure according to claim 17, wherein said first zone has an n type conductivity, said second zone a p type conductivity, and said third and fourth zones an n+ type conductivity.

References Cited in the file of this patent

UNITED STATES PATENTS

| | | |
|---|---|---|
| 2,655,610 | Ebers | Oct. 13, 1953 |
| 2,709,780 | Kircher | May 31, 1955 |
| 2,764,642 | Shockley | Sept. 25, 1956 |
| 2,779,877 | Lehovec | Jan. 29, 1957 |
| 2,795,742 | Pfann | June 11, 1957 |